United States Patent
Wulfmeyer et al.

(10) Patent No.: US 6,633,596 B1
(45) Date of Patent: Oct. 14, 2003

(54) FREQUENCY STABLE PULSED LASER

(75) Inventors: Volker G. Wulfmeyer, Boulder, CO (US); Mitchell Alfred Randall, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 243 days.

(21) Appl. No.: 09/584,249

(22) Filed: May 31, 2000

(51) Int. Cl.[7] .................................................. H01S 3/13

(52) U.S. Cl. .............................. 372/32; 372/28; 372/26

(58) Field of Search .............................. 372/26–33, 92, 372/3, 99, 32, 29.02

(56) References Cited

U.S. PATENT DOCUMENTS

| | | | | |
|---|---|---|---|---|
| 3,644,846 A | * | 2/1972 | Bridges et al. | 359/299 |
| 4,410,992 A | * | 10/1983 | Javan | 372/20 |
| 4,660,206 A | * | 4/1987 | Halmos et al. | 372/12 |
| 4,700,150 A | * | 10/1987 | Hall et al. | 359/279 |
| 4,841,529 A | * | 6/1989 | Javan | 372/32 |
| 4,955,725 A | * | 9/1990 | Johnson et al. | 372/22 |
| 5,077,748 A | * | 12/1991 | Kozlovsky et al. | 372/22 |
| 5,082,364 A | * | 1/1992 | Russell | 356/5.15 |
| 5,204,640 A | * | 4/1993 | Logan, Jr. | 331/9 |
| 5,245,459 A | * | 9/1993 | Faulkner et al. | 359/125 |
| 5,247,562 A | * | 9/1993 | Steinbach | 378/119 |
| 5,473,409 A | * | 12/1995 | Takeda et al. | 355/53 |
| 5,537,671 A | * | 7/1996 | Toyama et al. | 385/27 |
| 5,621,744 A | * | 4/1997 | Kikuchi et al. | 372/12 |
| 5,818,582 A | * | 10/1998 | Fernandez et al. | 250/458.1 |
| 5,917,179 A | * | 6/1999 | Yao | 250/205 |
| 6,101,021 A | * | 8/2000 | Kumagai et al. | 359/237 |
| 6,259,711 B1 | * | 7/2001 | Laurell | 372/102 |

OTHER PUBLICATIONS

Park, Y. K., et al., "Single Axial Mode Operation of a Q–Switched Nd: YAG Oscillator by Injection Seeding," Quantum Electron, IEEE, 20, pp. 117–125 (1984).

Rahn, Larry A., "Feedback stabilization of an injection–seeded Nd: YAG laser," Applied Optics, vol. 24 No. 7, pp. 940–942, (Apr. 1, 1985).

Grund, Cristian J., et al., "High–Resolution Doppler Lidar for Boundary–Layer and Cloud Research," Oceanic Atmos. Technol., University of Colorado (Boulder, Co), pp 1–59, (Apr., 2000).

(List continued on next page.)

*Primary Examiner*—Paul Ip
*Assistant Examiner*—T N Nguyen
(74) *Attorney, Agent, or Firm*—Duft Setter Ollila & Bornsen LLC

(57) ABSTRACT

A slave pulsed laser stabilizes the frequency by using the master laser frequency to stabilize a cavity in the slave pulsed laser. The slave pulsed laser includes an optical modulator, a cavity, a cavity modifier, and an output generator. The cavity includes an end reflector, a laser generator, an optical injector, and an output coupler. The optical modulator receives a continuous wave laser signal that includes a carrier frequency. The optical modulator then modulates the continuous wave laser signal to generate two sidebands around the carrier frequency. The laser generator generates a first laser signal in the cavity. The optical injector then injects the continuous wave laser signal with the first laser signal. The output generator generates an output signal based on the continuous wave laser signal. The cavity modifier then modifies a length of the cavity based on the output signal wherein the cavity is in resonance with the frequency of the continuous wave laser signal. The output coupler then transmits the pulsed first laser signal from the output coupler. The slave pulsed laser advantageously transmits the pulsed laser signal with non-detectable chirp for high signal-to-noise ratio.

14 Claims, 9 Drawing Sheets

OTHER PUBLICATIONS

Henderson, S. W., "Fast Resonance–detection technique for single–frequency operation of injection–seeded Nd: YAG lasers," Optical Society of America, Optics Letters Texas A&M University (College Station, TX), pp. 715–717 (Aug. 18, 1986).

Hamilton, Charles E., "Single–frequency, injection–seeded Ti:sapphire ring laser with high temporal precision," Optical Society of America, Optics Letters, vol. 17, No. 10, STI Optronics, Inc. (Bellevue, WA), pp. 728–730, (May 15, 1992).

Wulfmeyer, V., et al., "Single–mode operation of an injection–seeded alexandrite ring laser for application in water–vapor and temperature differential absorption lidar," Optical Society for America, Optics Letters, vol. 21, No. 15 (Hamburg, Germany), pp. 1150–1152, (Aug. 1, 1996).

Drever, R.W.P., et al.., "Laser Phase and Frequency Stablization Using an Optical Resonator," Applied Physics B, pp. 97–105, (1983).

Wulfmeyer, Volker, et al.., "High–Performance 2–um Doppler Lidar and its Shipborne Applications in the Tropical Marine Boundary Layer," Proceedings of the 20th International Laser Radar Conference, NCAR (Boulder, CO), (2000).

* cited by examiner

FREQUENCY STABLE PULSED LASER

FIELD OF INVENTION

This invention relates to a frequency stable pulsed laser.

PROBLEM

Laser designs account for frequency stabilization to achieve accuracy and high signal-to-noise ratio (SNR). Some laser designs use a master-slave configuration to achieve frequency stabilization. One implementation of a laser design is a Doppler Light Detection and Ranging (LIDAR) system that measures the velocity of a target. The targets are particles in the air, which are used to measure wind velocity. A transmitter transmits light that hits a moving target. The light reflects or scatters back off the target. The wavelength or frequency of the reflected light changes due to the Doppler shift caused by the moving target. The Doppler LIDAR system then determines the velocity of the target from the change in the wavelength.

The frequency stabilization of the Doppler LIDAR system is critical to achieve velocity measurements with high accuracy and high SNR. Particularly, frequency stabilization having low chirp is beneficial to achieve a high SNR. In coherent detection using a master slave configuration, a slave laser uses a local oscillator or master laser for a reference frequency. The transmitted pulse frequency is shifted from the local oscillator frequency to detect zero velocity and retrieve the sign of the reflected signal. In prior systems, single-frequency operation of the pulsed laser has used injection seeding. Injection seeding is a technique in which a pulsed laser is locked to the frequency of a continuous wave laser by flooding the pulsed laser cavity with continuous wave laser photons of the desired frequency prior to pulse generation.

In order to achieve master-slave configuration frequency stabilization, one prior system locked the master and slave resonator frequency to an external interferometer. Another system minimized the Q-switch build-up time for frequency stabilization. The offset between master and slave frequency was also observed to stabilize frequency. A ramp-and-fire technique, dither lock-in technique, and the observation of the resonance passively induced by flashlamp pump pulse have also been used for frequency stabilization. In a rough environment such as on a ship, stable operation of all these prior systems is difficult to achieve. Also, frequency chirp exists in these prior systems.

FIG. 1 depicts a laser phase and frequency stabilization system using an optical resonator in the prior art. The laser phase and frequency stabilization system uses phase modulation for frequency stabilization. This system stabilizes a continuous wave laser using a highly stable external reference cavity.

Solution

The invention solves the above problems by stabilizing the frequency of a pulsed slave laser using the master laser frequency to stabilize a cavity in the slave laser. The slave laser includes an optical modulator, a cavity, a cavity modifier, and an output generator. The cavity includes an end reflector, a laser generator, an optical injector, and an output coupler. The optical modulator receives a continuous wave laser signal that includes a carrier frequency. The optical modulator then modulates the continuous wave laser signal to generate two sidebands around the carrier frequency. The laser generator generates a first laser signal in the cavity. The optical injector then injects the continuous wave laser signal with the first laser signal. The output generator generates an output signal based on the continuous wave laser signal. The cavity modifier then modifies a length of the cavity based on the output signal wherein the cavity is in resonance with the frequency of the continuous wave laser signal. The output coupler then transmits the pulsed first laser signal from the output coupler.

In one embodiment, a Faraday isolator isolates the continuous wave laser signal before injection. In another embodiment, the laser generator pumps longitudinally two pump lights into a crystal to generate the first laser signal. In yet another embodiment, the optical injector injects the continuous wave laser signal with the first laser signal from a side at a perpendicular polarization of a path that the first laser signal propagates on.

The slave laser advantageously transmits a laser signal with stable frequency. In one embodiment, the frequency stability is approximately 0.2 MHz rms. Also, the slave laser transmits the laser signal with non-detectable chirp. The non-detectable chirp allows accurate velocity measurements with high SNR ratios. One example for velocity measurements is the measurement of wind.

DETAILED DESCRIPTION

Figure 1:
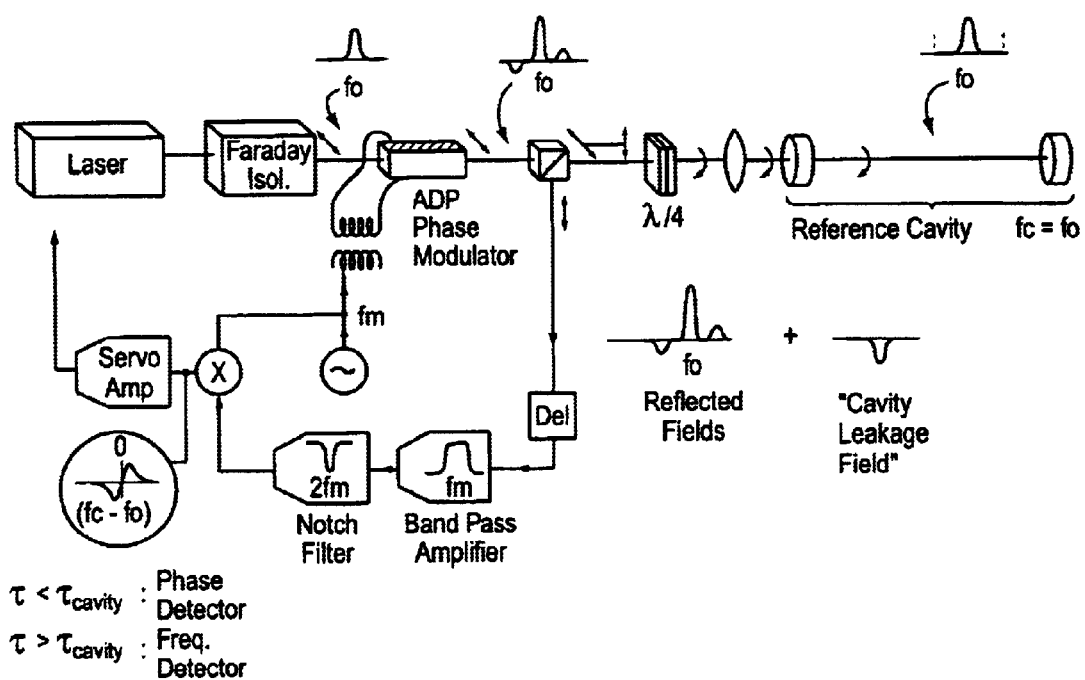
FIG. 1 illustrates a laser phase and frequency stabilization system using an optical resonator in the prior art.
Figure 2:
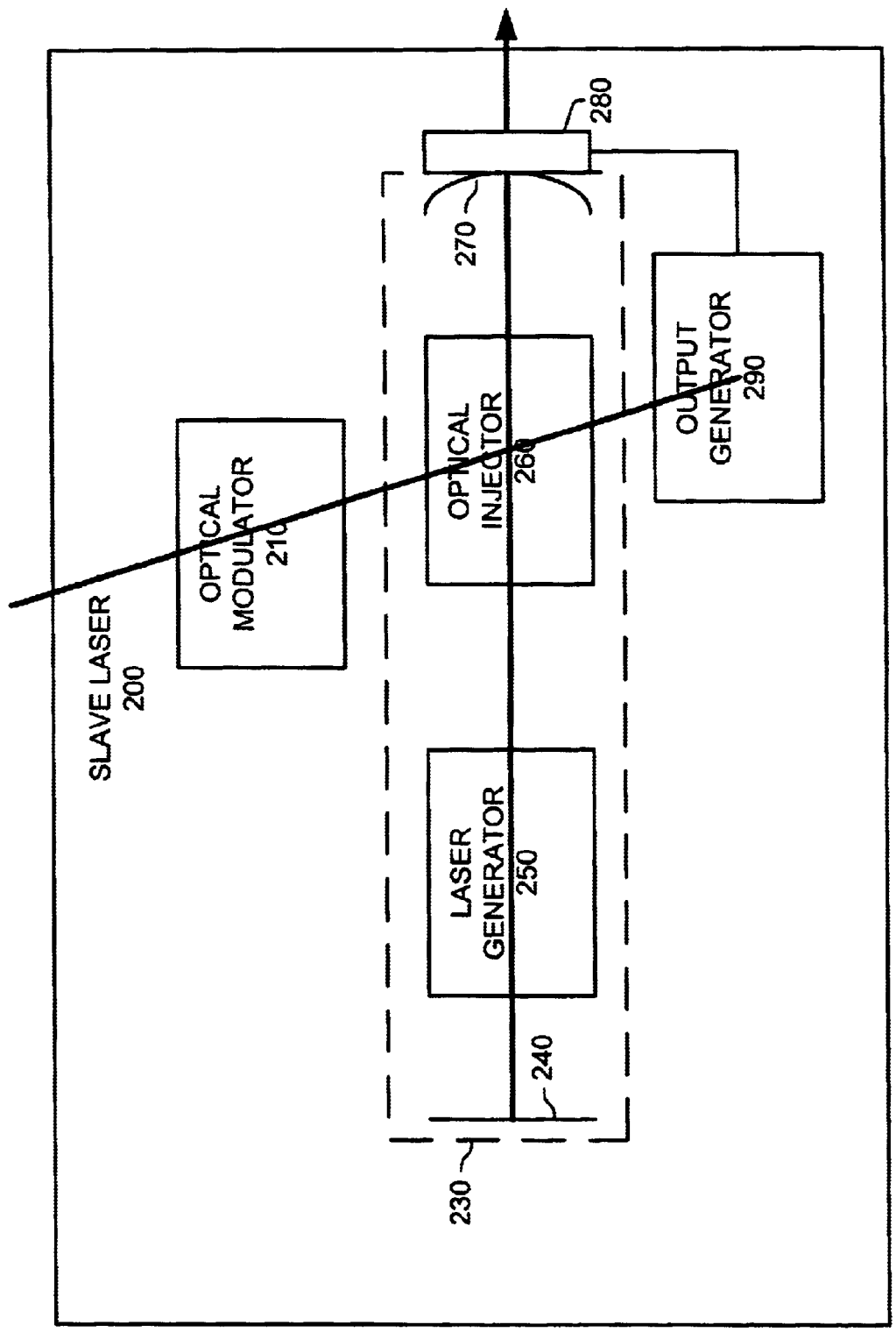
FIG. 2 is a block diagram of a slave laser in an example of the invention.

Slave Laser—FIG. 2

FIG. 2 depicts a block diagram of a slave laser 200 in an example of the invention. The slave laser 200 includes an optical modulator 210, a cavity 230, a cavity modifier 280, and an output generator 290. The cavity 230 comprises an end reflector 240, a laser generator 250, an optical injector 260, and an output coupler 270. The optical modulator 210 is optically configured with the optical injector 260. The end reflector 240 is optically configured with the laser generator 250. The laser generator 250 is optically configured with the optical injector 260. The optical injector 260 is optically configured with the output coupler 270 and the output generator 290. The output coupler 270 is connected with the cavity modifier 280. The cavity modifier 280 is connected with the output generator 290.

The optical modulator 210 is any optical modulator configured to receive a continuous wave laser signal that includes a carrier frequency and modulates the continuous wave laser signal to generate two sidebands around the carrier frequency. One example of an optical modulator is a phase modulator. The end reflector 230 is any mirror or reflector configured to bend or reflect light. In one embodiment, the end reflector 230 is a dielectric coating on one end of the laser generator 250 and configured to bend or reflect light. The laser generator 250 could be any optical device or combination of optical devices configured to generate a first laser signal in the cavity 230. One example of a laser generator is a combination of two laser diodes, quarter-waveplates, and a Tm:LuYAG crystal in a configuration to generate a laser signal.

The optical injector 260 is any optical device or combination of optical devices configured to inject the continuous wave laser signal with the first laser signal. One example of an optical injector is an acousto-optic modulator. The output generator 290 is any optical device or combination of optical devices configured to generate an output signal based on the continuous wave laser signal. The cavity modifier 280 is any device or combination of devices configured to modify a length of the cavity based on the output signal from the output generator 290 wherein the cavity 230 is in resonance with the frequency of the continuous wave laser signal. One example of a cavity modifier 280 is a piezoelectric crystal tube mounted on an output coupler. In other embodiments, the cavity modifier is not connected to the output coupler 270. The output coupler 270 is any optical device or combination of optical devices configured to transmit the pulsed first laser signal from the output coupler.

In operation, the optical modulator 210 receives a continuous wave laser signal that includes a carrier frequency. The optical modulator 210 then modulates the continuous wave laser signal to generate two sidebands around the carrier frequency. The laser generator 250 generates a first laser signal in the cavity 230. The optical injector 260 injects the continuous wave laser signal with the first laser signal. The output generator 290 generates an output signal based on the continuous wave laser signal. The output generator 290 then transmits the output signal to the cavity modifier 280. The cavity modifier 280 modifies a length of the cavity 230 based on the output signal wherein the cavity is in resonance with the frequency of the continuous wave laser signal. The output coupler 270 then transmits the pulsed first laser signal.

Slave Laser with Tm:LuYAG Crystal—FIGS. 3–9

FIGS. 3–9 disclose one embodiment of the invention, but the invention is not restricted to the configuration provided below. Those skilled in the art will appreciate numerous variations in a laser configuration and operation that are within the scope of the invention. Those skilled in the art will also appreciate how the principles illustrated in this example can be used in other examples of the invention. A particular reference number in one figure refers to the same element in all of the other figures.

Figure 3:
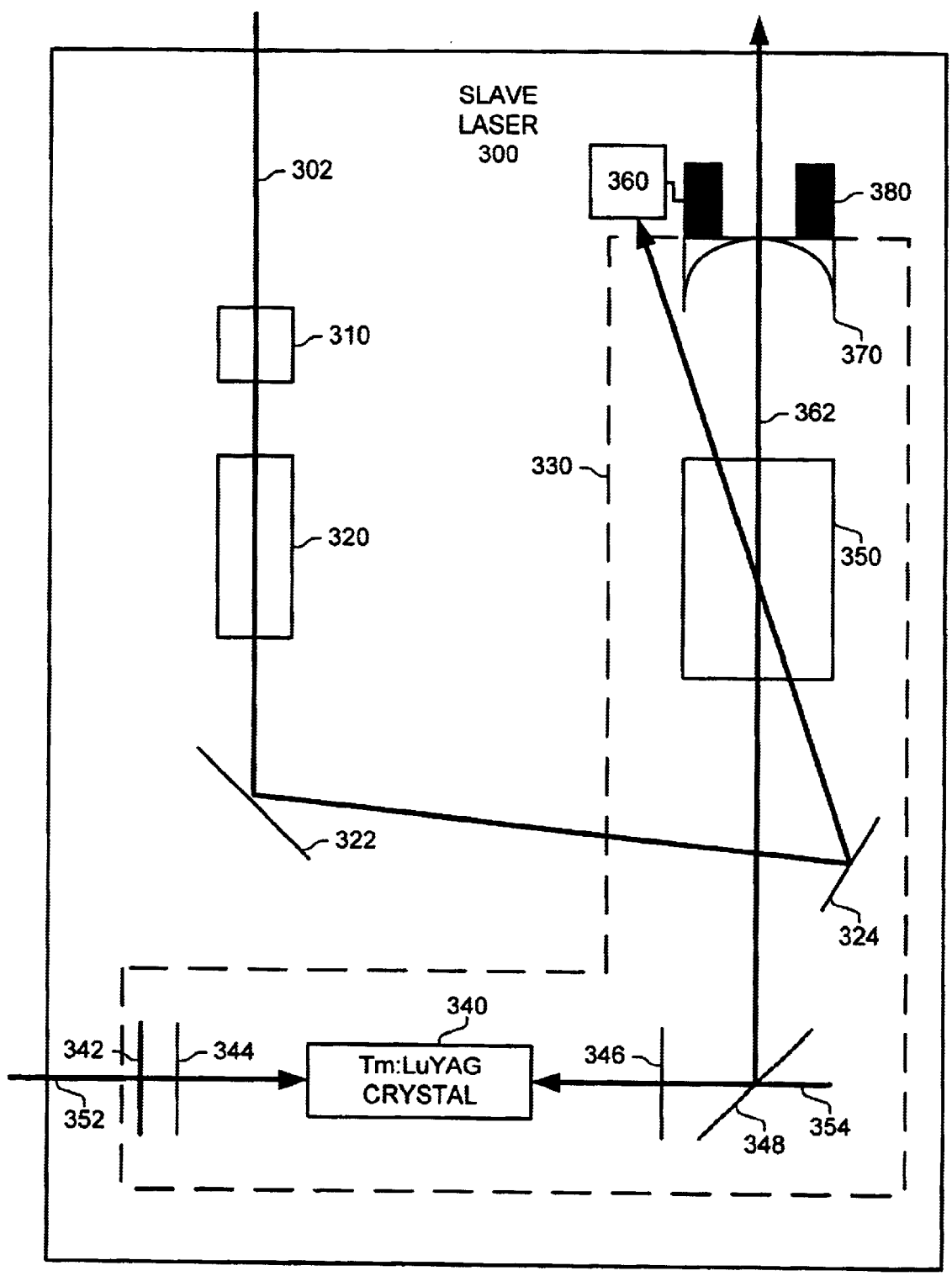
FIG. 3 is a block diagram of a slave laser with a Tm:LuYAG crystal in an example of the invention.

FIG. 3 depicts a block diagram of a slave laser 300 with a Tm:LuYAG crystal 340 in an example of the invention. The slave laser 300 comprises a phase modulator 310, a Faraday isolator 320, a bending mirror 322, a bending mirror 324, a cavity 330, an output generator 360, and a piezoelectric tube 380. The cavity 330 comprises a dicroic high reflector 342, a quarter-wave plate 344, the Tm:LuYAG crystal 340, a quarter-wave plate 346, a dicroic bending mirror 348, an acousto-optic modulator 350, and an output coupler 20 370.

The phase modulator 310 is optically configured with the Faraday isolator 320. The Faraday isolator 320 is optically configured with the bending mirror 322. The bending mirror 322 is optically configured with the bending mirror 324. The bending mirror 324 is optically configured with the acousto-optic modulator 350. The acousto-optic modulator 350 is optically configured with the output generator 360, the output coupler 370 and the dicroic bending mirror 348. The dicroic bending mirror 348 is optically configured with the quarter-wave plate 348. The quarter-wave plate 346 is optically configured with the Tm:LuYAG crystal 340. The Tm:LuYAG crystal 340 is optically configured with the quarter-wave plate 344. The quarter-wave plate 344 is optically configured with the dicroic high reflector 342.

In operation, the continuous wave laser signal 302 originates from a master laser or a local oscillator. The master laser is a continuous wave Tm:YAG laser with an output power of 60 mW. In this embodiment, the master laser's model number is a CLR-2 from CTI Inc. The master laser wavelength is tuned to a window with high atmospheric transmission at 2021.86 nm. 3% of the laser power of the continuous wave laser signal is used for injection seeding.

The phase modulator 310 receives the continuous wave laser signal 302 that includes a carrier frequency. The phase modulator 310 is a 40 MHz phase modulator. In this embodiment, the phase modulator's 310 model number is REM-101-P-2 with driver 305D from Quantum Technology Inc. The phase modulator 310 modulates the continuous wave laser signal to generate two sidebands at ±40 MHz around the carrier frequency. The driver of the phase modulator 310 operates with a power of 2.5 W. The ratio between the carrier frequency and the sidebands is 6:1 based on the 2.5 W power.

The Faraday isolator 320 transfers the continuous wave laser signal from the phase modulator 310 to the bending mirror 322. In this embodiment, the Faraday isolator's 320 model number is OFR I-3-HoYAG. The Faraday isolator 320 isolates the continuous wave laser signal to protect the master laser from backpropagated pulses from the slave laser 300 which may cause frequency instabilities. Also, the backpropagated resonance signal of the injected field could be coupled out at the first polarizer of the Faraday isolator 320 for observations. The bending mirror 322 bends the continuous wave laser signal towards the bending mirror 324. The bending mirror 324 bends the continuous wave laser signal towards the acousto-optic modulator 350 for injection seeding.

The Tm:LuYAG crystal 340 is doped with 4% thullium. The length of the Tm:LuYAG crystal 340 is 13 mm and the diameter is 4 mm. Thermoelectric coolers control the temperature of the Tm:LuYAG crystal 340 to approximately 15 degrees Celsius. Two fiber-coupled 785 nm, 15 W diode lasers with a numerical aperture of 0.1 longitudinally pump a pump light 352 and a pump light 354 into the Tm:LuYAG crystal 340. In this embodiment, the fiber-coupled diode laser's model number is B015-785-FCPS from Optopower. The dicroic high reflector 342 and the dicroic bending mirror 348 focus the pump light 352 and 354 in the Tm:LuYAG crystal 340. The diameter of the pump light 352 and 354 is approximately 0.6 mm. The quarter-wave plate 344 and the quarter-wave plate 346 placed around the Tm:LuYAG crystal 340 minimizes spatial hole burning. The longitudinal pumping of the pump lights 352 and 354 in combination with the Tm:LuYAG crystal 340 generates a first laser signal in the cavity 330. The power of the first laser signal is 460 mW when longitudinally pumped with 10 W from both sides in continuous wave operation.

The acousto-optic modulator 350 performs Q-switch operations with a 30 W driver running with a power of approximately 14 W. The 30 W driver's model number is GE-10025DN from Intraaction. In this embodiment, the 100 MHz acousto-optic modulator's 350 model number is AQS-1003-AW19 from Intraaction. The laser repetition rate is 200 Hz. Without injection seeding, the power of the continuous wave laser signal is 430 mW. With injection seeding, the power of the continuous wave laser signal reduces to 410 mW. At this point, the pulse energy is approximately 2 mJ. The pulse duration has a full-width at half maximum (FWHM) of 220 ns. The acousto-optic modulator 350 injects the continuous wave laser signal with the first laser signal from a side at a perpendicular polarization of a path that the first laser signal propagates on to perform injection seeding. The acousto-optic modulator 350 causes a 100 MHz frequency shift of the continuous wave laser signal. This frequency shift between the slave laser 300 and the master laser is required for Doppler wind measurements.

The output generator 360 generates an output signal based on the continuous wave laser signal. The operation of the output generator 360 is discussed in greater detail in FIG. 4 below. The piezoelectric crystal tube 380 then modifies a length of the cavity 330 based on the output signal wherein the cavity is in resonance with the frequency of the continuous wave laser signal. In this embodiment, the piezoelectric tube's 380 model number is P-305.10 from Physik Instrumente. The piezoelectric crystal tube 380 has an open loop travel of 10 $\mu$m @ 1000V. The output coupler 370 then transmits the pulsed first laser signal.

Figure 4:
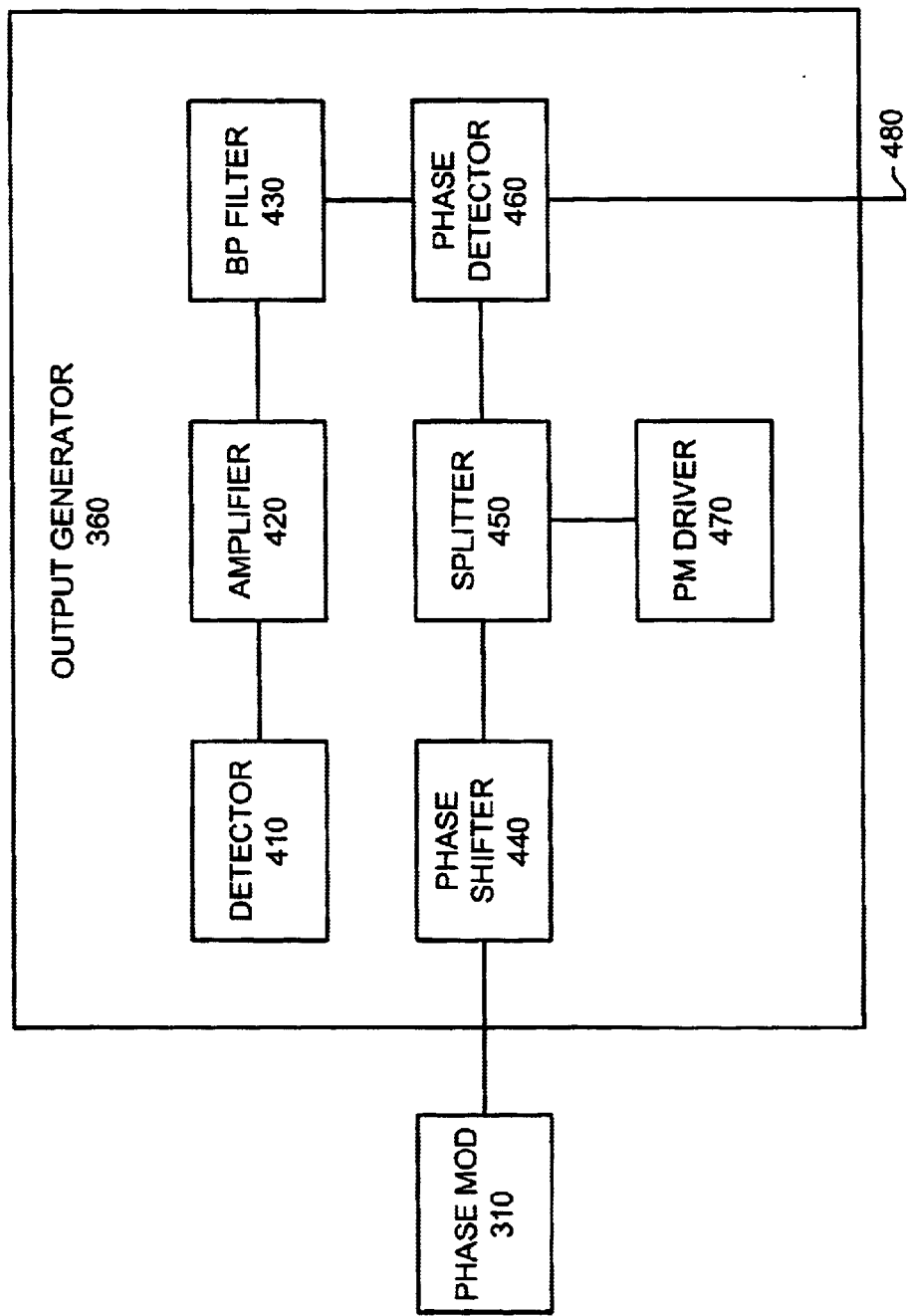
FIG. 4 is a block diagram of an output generator in an example of the invention.

FIG. 4 depicts a block diagram of an output generator 360 in an example of the invention. The output generator 360 comprises an InGaAs detector 410, an amplifier 420, a 40 MHz bandpass filter 430, a phase shifter 440, a 90:10 splitter 450, a phase detector 460, and a phase modulator 470 driver. The InGaAs detector 410 is connected to the amplifier 420. The amplifier 420 is connected to the bandpass filter 430. The bandpass filter is connected to the phase detector 460. The phase detector 460 is connected to the splitter 450 and an output link 480. The output link 480 is connected to the piezoelectric crystal tube 370 in FIG. 3 The splitter 450 is connected to the phase shifter 440 and the phase modulator driver 470. The phase shifter 440 is connected to the phase or optical modulator 310 from FIG. 3.

In operation, the InGaAs detector 410 detects the continuous wave laser signal that propagated through the acousto-optic modulator 350. The InGaAs detector 410 generates and transmits an output signal that includes the carrier frequency, the two sidebands, and a resonance field of the cavity 330 to the amplifier 420. The amplifier 420 amplifies the output signal. In this embodiment, the amplifier's 420 model number is AU-1447 from MITEQ. The 40 MHz bandpass filter 430 then filters the output signal. In this embodiment, the 40 MHz bandpass filter's 430 model number is 5BP8-40-10-S from Lorch.

The phase modulator driver 470 generates and transmits a driver signal to the splitter 450. The splitter 450 is a 90:10 splitter with 10% of the driver signal directed towards the phase detector 460. The 40 MHz phase shifter 440 compensates for the phase delay between the detector 410 and the driver signal at the phase modulator driver 470. The phase shifter 440 transfers the driver signal to the phase modulator 310.

The phase detector 460 modulates the output signal based on the driver signal from the splitter 450. The phase detector 460 then transfers the output signal over the output link 480. The output link 480 is connected to the piezoelectric crystal tube 380 via a typical feedback loop. In one embodiment, the feedback loop includes a differential integrator device and an amplifier to drive the piezoelectric crystal tube 380.

Figure 5:
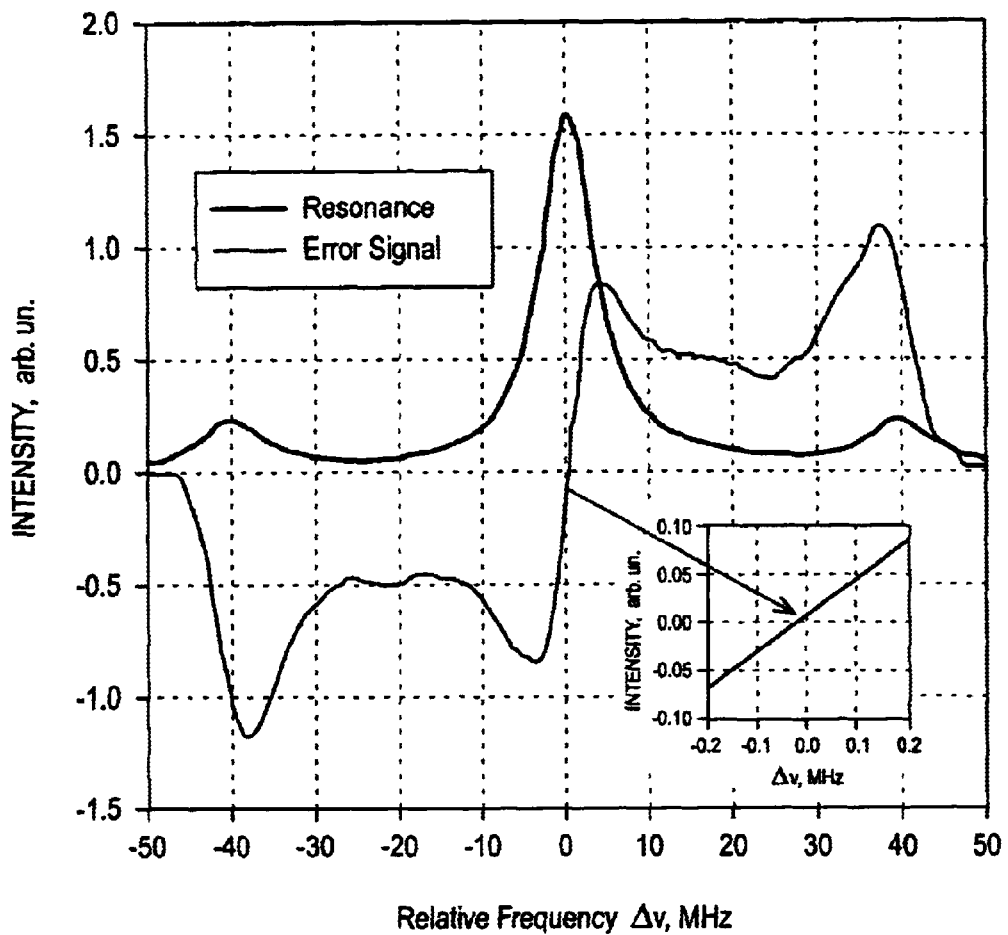
FIG. 5 is a graph of intensity vs. relative frequency for a resonance signal and an output signal in an example of the invention.

FIG. 5 depicts a graph of intensity vs. relative frequency for a resonance signal and an output signal in an example of the invention. The resonance signal was measured from an InGaAs detector attached to the first polarizer of the Faraday isolator 320. The resonance has a FWHM of 8 MHz. Both signals were produced by applying a voltage ramp to the piezoelectric crystal tube 380. FIG. 5 shows that the output signal changes sign within 10 kHz at resonance and extends to ±45 MHz around the resonance. If there are no significant changes of the optical phase in the cavity 330 during the pulse build-up time, the frequency chirp can be neglected.

Figure 6:
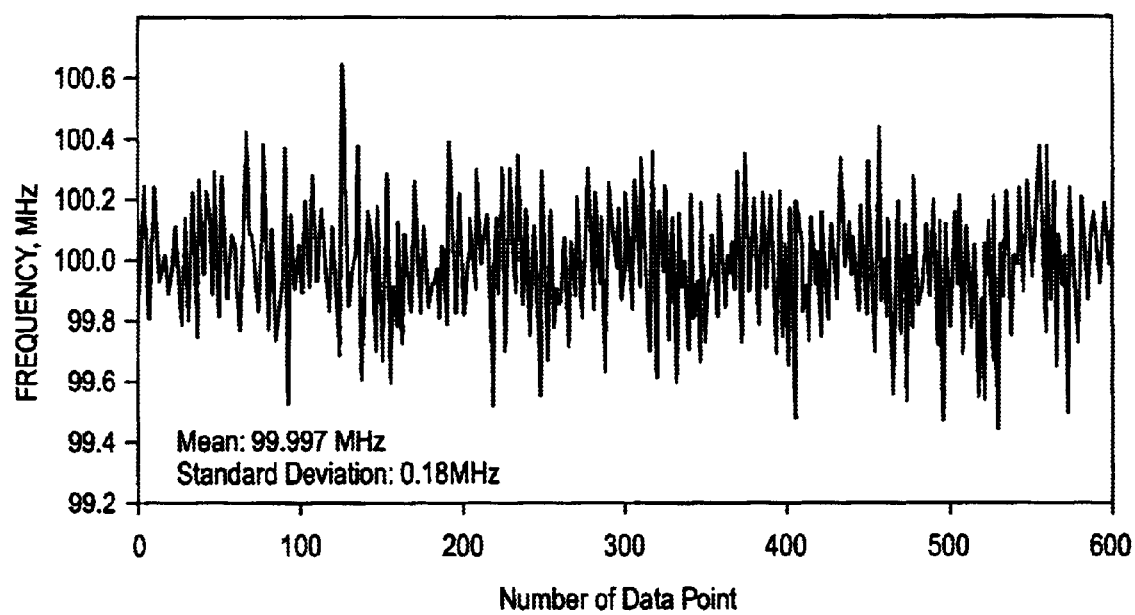
FIG. 6 is a graph of frequency vs. number of data point for a measurement of beatnote frequency between a master laser and a laser pulse from a slave laser in an example of the invention.
Figure 7:
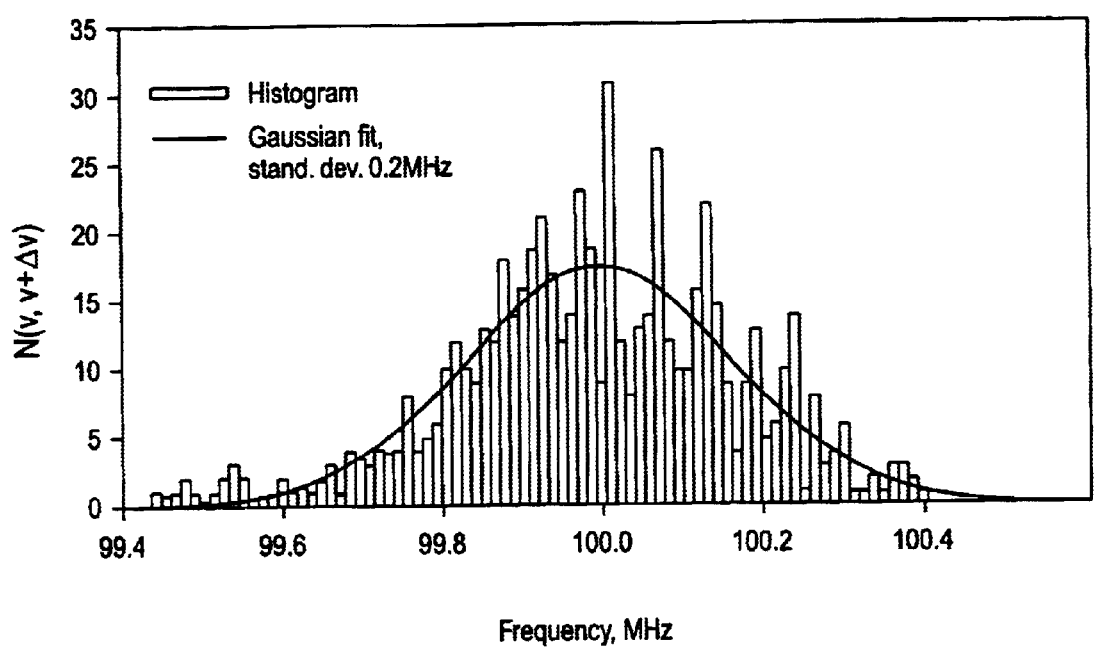
FIG. 7 is a graph of N vs. frequency for a spectral analysis of frequency fluctuations in an example of the invention.

FIGS. 6 and 7 show an analysis of the short term frequency of the slave laser 300. FIG. 6 depicts a graph of frequency vs. number of data point for a measurement of beatnote frequency between a master laser and a laser pulse from the slave laser 300 in an example of the invention. FIG. 7 depicts a graph of N vs. frequency for a spectral analysis of frequency fluctuations in an example of the invention. FIGS. 6 and 7 show measurements recorded on a field campaign at the Table Mountain facility in Boulder, Colo. FIGS. 6 and 7 show a frequency stability of 0.2 MHz rms at a frequency offset of 0.003 MHz. This frequency stability corresponds to a wind measurement error of 3 mn/s with a shot-to-shot frequency correction. The frequency offset could be fine tuned to 0.1 MHz/W by changing the RF power of the acousto-optic modulator 350. In another embodiment aboard a shipborne platform in heavy sea, the frequency stability was also 0.2 MHz rms. Operation under 100% duty cycle is possible under rough conditions.

Figure 8:
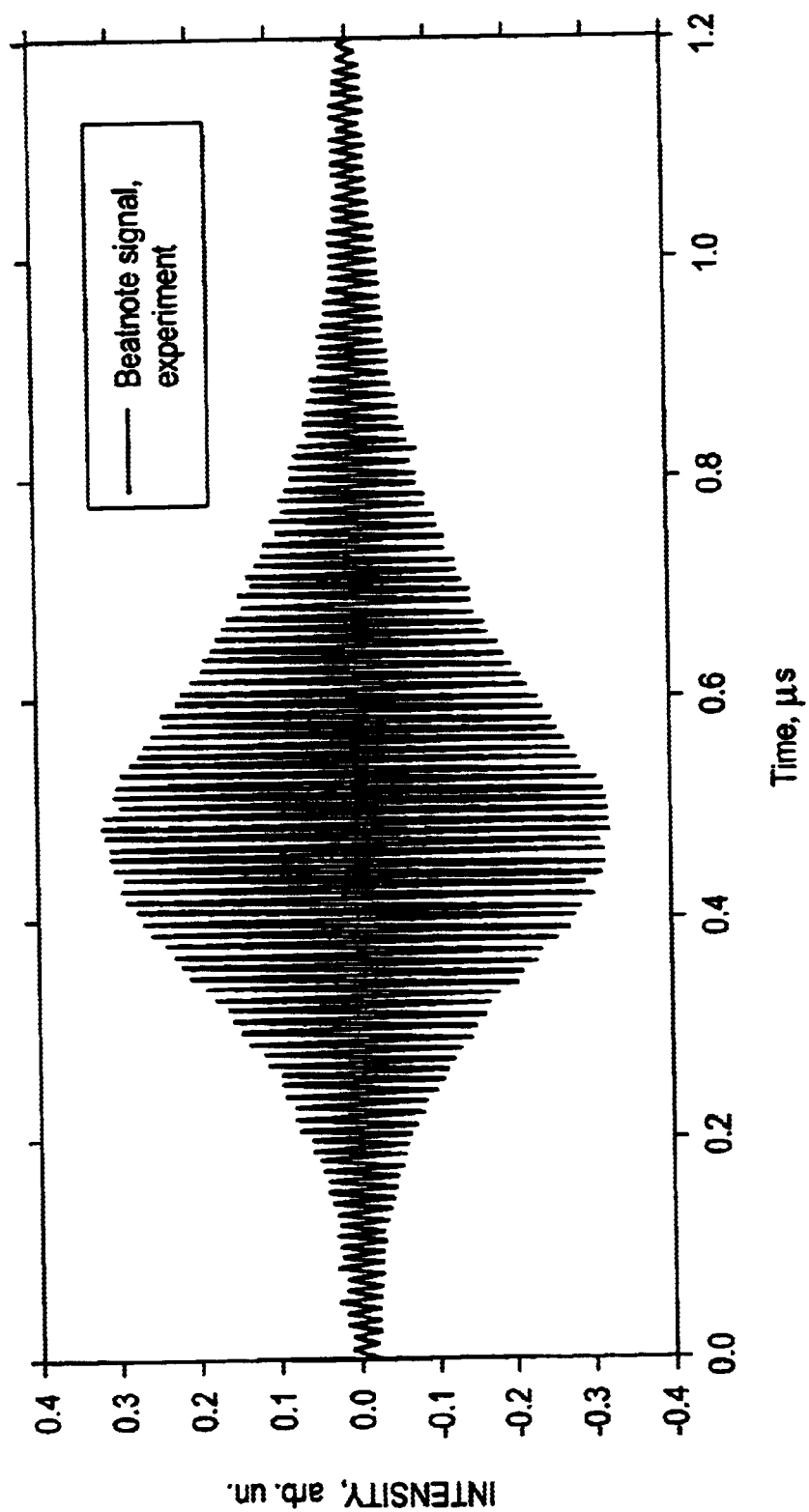
FIG. 8 is a graph of intensity vs. time for a single-shot beatnote signal between the master laser and the slave laser in an example of the invention.
Figure 9:
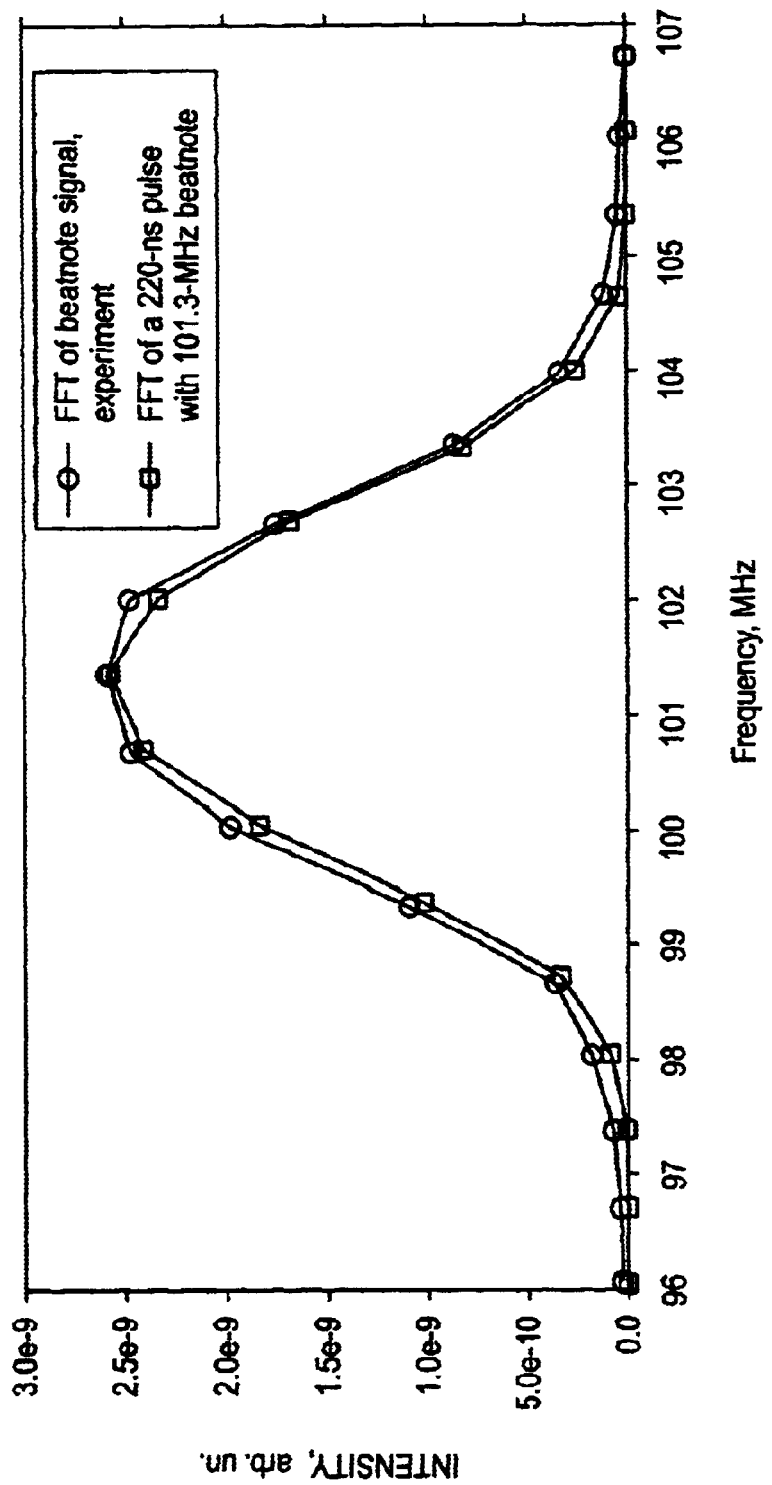
FIG. 9 is a graph of intensity vs. frequency of a Fast Fourier Transform of the beatnote signal in an example of the invention.

FIGS. 8 and 9 show a beatnote signal and spectral analysis of the slave laser 300 pulse. FIG. 8 depicts a graph of intensity vs. time for a single-shot beatnote signal between the master laser and the slave laser 300 in an example of the invention. The beatnote signal was sampled over 1.5 $\mu$s with a resolution of 0.1 ns using an 8-bit digitizing oscilloscope. A slight asymmetry of the pulse intensity occurred in the time domain but not in the frequency domain. FIG. 9 depicts a graph of intensity vs. frequency of a Fast Fourier Transform (FFT) of the beatnote signal in an example of the invention. The FFT of the beatnote signal shows a symmetric spectrum with a halfwidth of about 1.8 MHz. Based on the FFT of the beatnote signal and the FFT of a 220 ns pulse with a Gaussian envelope mixed with a 101.3 MHz signal, a significant deviation between the profiles is not observed. Also, a frequency chirp is not observed. If any chirp exists, the chirp must be significantly less than the Fourier limited halfwidth of the laser pulse spectrum that does not have any negative influence of the SNR of a Doppler lidar measurement.

Those skilled in the art will appreciate variations of the above-described embodiments that fall within the scope of the invention. As a result, the invention is not limited to the specific examples and illustrations discussed above, but only by the following claims and their equivalents.

What is claimed:

1. A method of stabilizing the frequency of a pulsed laser, the method comprising:

receiving a continuous wave laser signal that includes a carrier frequency into an optical injector;

in the optical injector modulating the continuous wave laser signal to generate two sidebands around the carrier frequency;

in a laser generator, generating pulsed laser signal in a cavity that includes the laser generator, a cavity modifier, an output coupler, the optical injector, and an end reflector;

in the optical injector, injecting the continuous wave laser signal with the first laser signal;

in an output generator, generating an output signal based on a phase of the continuous wave laser signal;

adjusting the cavity modifier to modify a length of the cavity based on the output signal wherein the cavity is in resonance with the frequency of the continuous wave laser signal; and transmitting the pulsed laser signal from the output coupler.

2. The method of claim 1 further comprising isolating the continuous wave laser signal.

3. The method of claim 1 wherein the cavity is an L-shaped cavity.

4. The method of claim 1 wherein generating the pulsed laser signal in the cavity further comprises pumping longitudinally two pump lights into a crystal.

5. The method of claim 1 wherein injecting the continuous wave laser signal with the pulsed signal is from a side at a perpendicular polarization of a path that the first laser signal propagates on.

6. The method of claim 1 further comprising:

detecting the continuous wave laser signal;

generating an output signal based on the continuous wave laser signal;

amplifying the output signal;

filtering the output signal;

generating a driver signal for a phase modulator; and modulating the output signal based on the driver signal.

7. The method of claim 1 further comprising generating the continuous wave laser signal that includes the carrier frequency.

8. A pulsed laser stabilizing system for stabilizing the frequency of a pulsed laser that is connected to a master laser, the pulsed laser comprising:

a receiving means for receiving a continuous wave laser signal that includes a carrier frequency into an optical injector, a modulating means for modulating the continuous wave laser signal to generate two sidebands around the carrier frequency;

a generating means for generating the pulsed laser signal in a cavity that includes the laser generator, an output coupler, the optical injector, and an end reflector;

an injecting means for injecting the continuous wave laser signal with the pulsed laser signal;

an output generator means for generating an output signal based on the phase of the continuous wave laser signal;

a cavity modifying means for modifying a length of the cavity based on the output signal wherein the cavity is in resonance with the frequency of the continuous wave laser signal; and a transmitting means for transmitting the pulsed laser signal.

9. The pulsed laser stabilizing system of claim 8 further comprising isolating means for isolating the continuous wave laser signal.

10. The pulsed laser stabilizing system of claim 8 wherein the cavity is an L-shaped cavity.

11. The pulsed laser stabilizing system of claim 8 wherein the means for generating the pulsed laser signal in the cavity comprises a means for pumping longitudinally two pump lights into a crystal.

12. The pulsed laser stabilizing system of claim 8 wherein the means for injecting the continuous wave laser signal with the pulsed laser signal injects the continuous wave laser signal from a side at a perpendicular polarization of a path that the pulsed laser signal propagates on.

13. The pulsed laser stabilizing system of claim 8 further comprising:

detecting means for detecting the continuous wave laser signal;

output generating means for generating an output signal based on the continuous wave laser signal;

amplifying means for amplifying the output signal;

filtering means for filtering the output signal;

generating means for generating a driver signal for a phase modulator; and modulating means for modulating the output signal based on the driver signal.

14. A pulsed laser stabilizing system for stabilizing the frequency of a pulsed laser, the pulsed laser comprising:

a generating means for generating a continuous wave laser signal that includes a carrier frequency;

a modulating means for modulating the continuous wave laser signal to generate two sidebands around the carrier frequency;

a generating means for generating the pulsed laser signal in a cavity that includes the laser generator, an output coupler, an optical injector, and an end reflector;

an injecting means for injecting the continuous wave laser signal with the pulsed laser signal;

an output signal generating means for generating an output signal based on the phase of the continuous wave laser signal;

a cavity modifying means for modifying a length of the cavity based on the output signal wherein the cavity is in resonance with the frequency of the continuous wave laser signal; and a transmitting means for transmitting the pulsed laser signal.

* * * * *